C. J. LUTHER.
DRIVE CHAIN.
APPLICATION FILED SEPT. 21, 1910.

1,028,893.

Patented June 11, 1912.

INVENTOR:
Charles J. Luther,

WITNESSES:
René Bruine
William F. Martinez

By Attorneys,
Fraser Burk & Myers

UNITED STATES PATENT OFFICE.

CHARLES J. LUTHER, OF ELIZABETH, NEW JERSEY, ASSIGNOR OF ONE-HALF TO FRANCIS E. KNOWLES, OF SOUTH ORANGE, NEW JERSEY.

DRIVE-CHAIN.

1,028,893. Specification of Letters Patent. Patented June 11, 1912.

Application filed September 21, 1910. Serial No. 582,972.

*To all whom it may concern:*

Be it known that I, CHARLES J. LUTHER, a citizen of the United States, residing in Elizabeth, in the county of Union and State of New Jersey, have invented certain new and useful Improvements in Drive-Chains, of which the following is a specification.

This invention relates to drive chains and aims to provide certain improvements therein.

One of the objects of the present invention is to provide a drive chain which is especially adapted for heavy duty such as the driving of motor trucks or the like, and which is so constructed that the minimum of friction is developed in its use.

A further object is to provide a chain in which the individual links are strongly constructed, and are connected in such manner that the chain as a whole presents no relatively weak parts.

A still further object is to provide a drive chain or the like in which any individual link may be quickly removed and another substituted for it.

Other features of improvement will be hereinafter more fully described.

Figure 1:
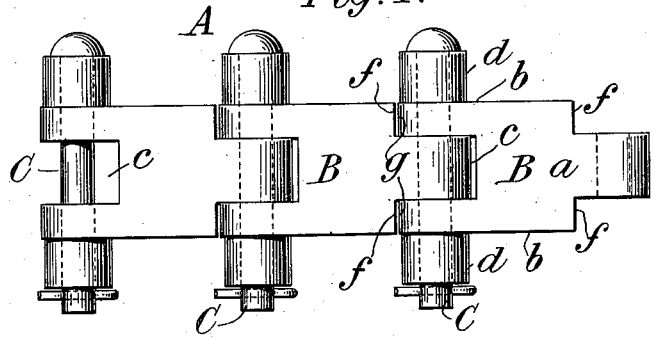
Figure 2:
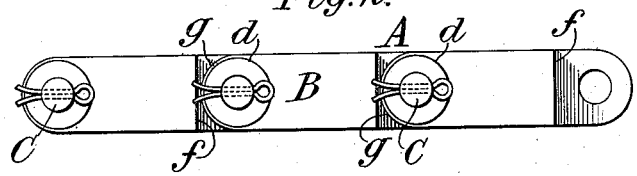
Figure 3:
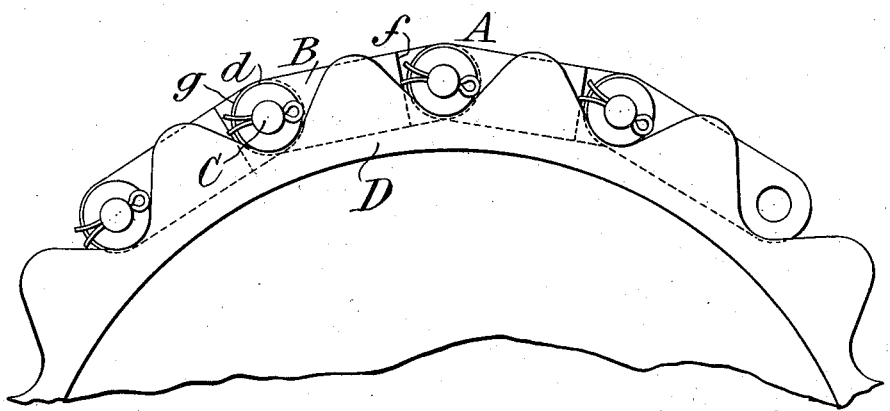
Figure 5:
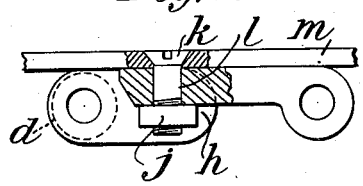
Figure 4:
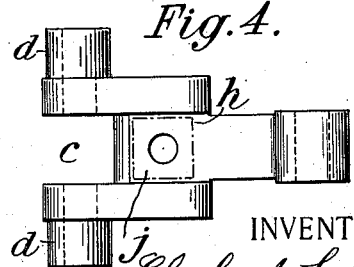

Referring to the drawings which illustrate one form of chain provided by my invention,—Figure 1 is a plan view of a short length of chain. Fig. 2 is a side elevation of Fig. 1. Fig. 3 is a side elevation of a part of a sprocket wheel showing the engagement of my improved chain therewith. Fig. 4 is a plan of another form of link embodying the invention. Fig. 5 is a side elevation thereof, partly in section.

Referring first to Figs. 1 to 3 of the drawings, let A indicate the chain as a whole, which is shown as composed of a series of links B B pivoted together by pins C. Each of the links B is shown as of integral construction, being provided with a body portion $a$ having side members or arms $b$ the forward ends of which form between them a recess $c$ adapted to receive the shank or body of the next adjacent link. The arms or side members $b$ are formed with holes through which and the shank of the next adjacent link the pin C passes. According to the present invention I provide driving members or abutments $d$ which extend laterally outward from each side of the arms $b$. It is practically essential to the invention that these driving members, which are preferably of circular form, shall be integral with the arms $b$ of the link since their principal function is to relieve the pivot pins of the strain of driving, such strains being taken up by the link as a whole. In chains directly utilizing projecting pivot pins as their driving members, it is found that such pins while efficient in use are nevertheless in practice subject to bending and other injury. Difficulty has also been found in providing adequate means for removably holding the pins in position so that the links can be replaced as desired. In my present construction the driving projections $d$ extend around the pivot pins C and are preferably arranged concentrically therewith. Hence the pivot pins do not contact with the driving teeth of the sprocket, this function being performed by the projections.

While it is not essential that the contour of the projection $d$ shall be truly circular, it is important that in general contour their working faces shall be disposed concentrically with the pivot pins. By reference to Fig. 3 which illustrates a sprocket wheel with a section of my improved chain in engagement therewith, it will be seen that the working faces of the sockets between the teeth of the sprocket wheel D are substantially concentric with the pivotal axes of the links. By this means the driving strains are exerted against the links close to the center of movement between each two adjacent links. There is hence less friction developed in the operation of the chain and less tendency for the chain to jump or creep from the sprocket wheel in use. It is to be understood that the chain illustrated is adapted for use in connection with a double sprocket wheel, and that space is provided between the two sides of the wheel to receive the body portion and side arms of the link when the driving projections $d$ are engaged in the recesses of the wheel.

The projections $d$ will be of such diameter as to adequately withstand the strains for which the chain is constructed. It is desirable, however, not to unduly enlarge such projections, and they are therefore preferably constructed of not greater diameter than the length of the recess $b$ of each link. Preferably also the diameter of the projections $d$ does not materially exceed the thickness of the body of the link, as illustrated in Fig. 2.

While the general shape and construction of the body of the link may be varied, it is practically necessary that the arms $b$ at least so far as their outer sides are concerned shall be of greater length than the diameter of the projections $d$. Otherwise insufficient metal would be left between the arms and the body portion to withstand the strains of use. The sides of the arms preferably are extended rearwardly a sufficient distance to constitute long bearing faces for the sides of the sprocket teeth, in order to prevent sidewise movements of the chain. They preferably also approach the next adjacent link to the rear sufficiently closely to prevent the engagement of a sprocket tooth between the end of the arm and the front of the next adjacent link. In some of the claims I have defined such a structure by stating that the body of the chain has substantially continuous sides. The recess $c$ which receives the shank of the next forward link, should also not be so large as to admit a tooth between such shank and the front of the body portion of the next rearward link. This construction is defined in the claims by the statement that each link has a substantially-closed body portion.

The construction herein described permits of the ready removal of a link and substitution of a new link. In chains in which the pivot pins are utilized as driving projections there is great difficulty in holding the pins in place with sufficient security to enable them to sustain the strains of use, while at the same time providing for their easy removal. By the present invention, however, since the pins are not directly utilized as driving projections, they may be easily held in place by providing a cotter pin at each end or by heading up one end of the pin as shown in Figs. 1 and 2, and providing a cotter pin at the opposite end. The head and pin do not contact with the teeth of the sprocket wheel, and are hence subject to no special strain. Any other suitable means for holding the pins in place may be substituted for that shown.

In Figs. 4 and 5 I have illustrated my invention as applied to a driving chain adapted for elevators or the like. In these figures each link is constructed with a recess $h$ on one side which is adapted to receive a nut $j$ which engages a screw bolt $k$ passing through a bolt hole $l$ in the link. In Fig. 5 I have illustrated conventionally a wall $m$ of an elevator pocket showing the same attached to one of the links. By this construction the nut and projecting end of the bolt are housed within the link so that they do not project below the under side thereof.

The invention herein described is useful for chains of various types, and is especially adapted for heavy driving purposes. It is exceedingly strong and durable, and acts with a minimum of friction.

I do not wish to be limited to the exact constructions herein described as it is obvious that various changes may be made therein without departing from the spirit of the invention.

What I claim is:—

1. In a chain, a series of links, each comprising an integral structure having a substantially closed body portion and side arms provided with a recess between them adapted to receive the shank of the next adjacent link, pivot pins extending through said side arms and the shanks of the adjacent links, and each link having integral driving projections extending outwardly from said side arms and surrounding said pivot pins.

2. In a chain, a series of links, each comprising an integral structure having a substantially closed body portion and side arms provided with a recess between them adapted to receive the shank of the next adjacent link, said side arms each extending rearwardly of said recess a distance at least equal to the thickness of the arm, and pivot pins extending through said side arms and the shanks of the adjacent links, and each link having integral driving projections extending outwardly from said side arms and surrounding said pivot pins, said driving projections having a diameter materially less than the exterior length of said side arms.

3. In a chain, a series of links each comprising an integral structure having a substantially-closed body portion and side arms provided with a recess between them adapted to receive the shank of the next adjacent link, pivot pins extending through the side arms and shanks of the adjacent links, and each link having integral driving projections extending outwardly from said side members and surrounding said pivot pins.

4. In a chain, a series of links each comprising an integral structure having a substantially-closed body portion and side members provided with a recess between them adapted to receive the shank of the next adjacent link, pivot pins extending through the side members and shanks of the adjacent links, each link having integral driving projections extending outwardly from said side members and surrounding said pivot pins, and said pivot pins being removable from the links and having means engaging the outer ends of said driving projections, one of said means being removable.

5. In a chain, a series of links each comprising an integral structure having a substantially-closed body portion and side arms provided with a recess between them adapted to receive the shank of the next adjacent link, pivot pins extending through the side members and shanks of the adjacent links, and each link having integral driving projections extending outwardly from said side members and surrounding said pivot pins, each of said pivot pins having a head at one end and a cotter pin at the opposite end.

In witness whereof, I have hereunto signed my name in the presence of two subscribing witnesses.

CHARLES J. LUTHER.

Witnesses:
 EUGENE V. MYERS,
 FRED WHITE.